July 30, 1929. S. B. SHORT 1,722,865
MOVABLE LIGHT
Filed Sept. 15, 1928
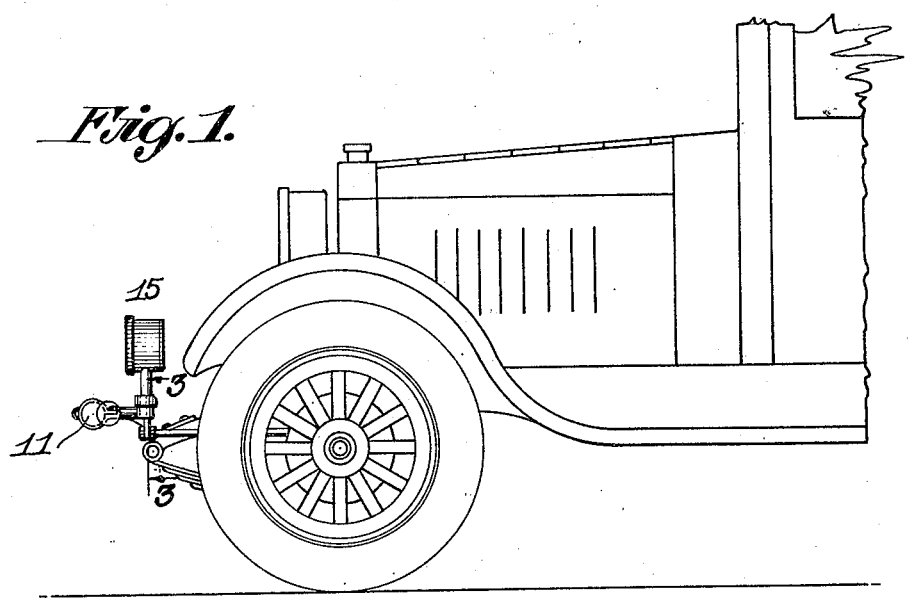
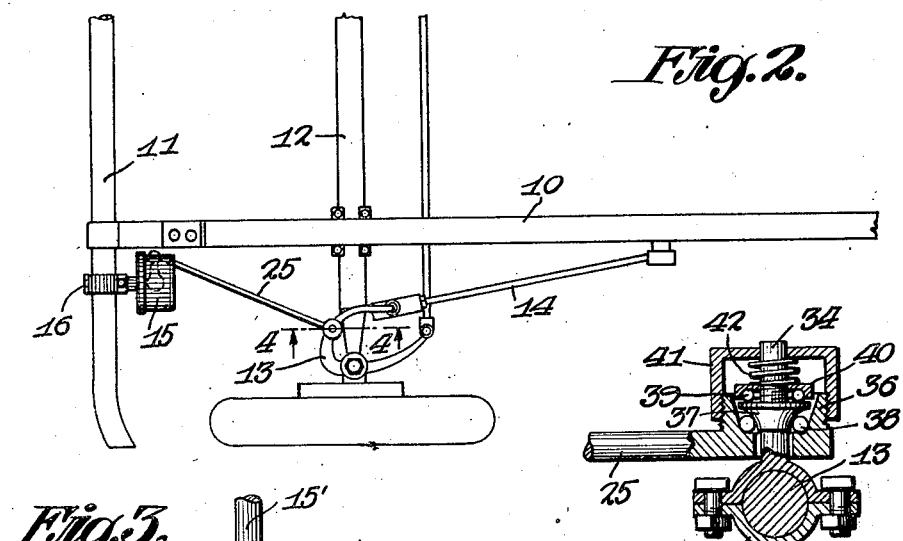
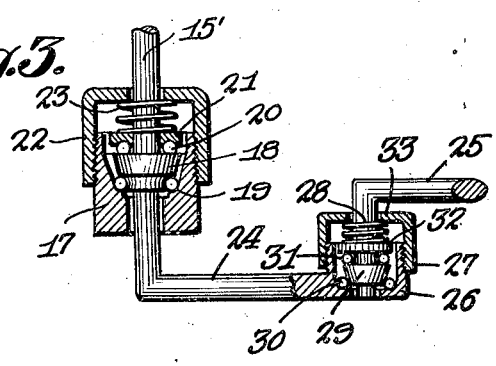
S. B. Short, INVENTOR
BY *Victor J. Evans*
ATTORNEY Patented July 30, 1929.

1,722,865

UNITED STATES PATENT OFFICE.

SAM BOYKIN SHORT, OF BATON ROUGE, LOUISIANA.

MOVABLE LIGHT.

Application filed September 15, 1928. Serial No. 306,193.

This invention relates to headlamps for automobiles, and more particularly to a novel construction of means for mounting said headlamps for movement with the steering mechanism of the machine, so that the light rays will always be maintained directly in advance of the course pursued by the vehicle.

The chief object of the present invention resides in the novel construction of means for mounting the headlamps for this purpose, so that the lamps can be easily turned incident to the steering of the vehicle, and at the same time eliminate rattling or undue vibration of the lamps.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 1 is a fragmentary side elevation of an automobile showing the application of the invention.

Figure 2 is a fragmentary plan view of the running gear of the machine showing the application of the invention.

Figure 3 is a sectional view on line 3—3 of Figure 1.

Figure 4 is a sectional view on line 4—4 of Figure 2.

Referring to the drawings in detail, 10 indicates the frame of the machine at the forward end of which is supported a bumper 11 of any suitable construction. The front axle is indicated at 12, while the steering arm is indicated at 13 and connected with the usual drag link 14.

One of the headlamps is indicated at 15 and is supported by a post 15' journaled in a suitable bearing supported by a clamp 16 surrounding the bumper 11.

This bearing preferably embodies a socket like member 17 supported by the clamp 16, and designed to accommodate the cone shaped portion 18 on the lamp post 15', and which cone shaped portion reposes upon a series of ball bearings 19 as clearly illustrated in Figure 3. Another series of similar ball bearings 20 repose upon the cone shaped portion and are held associated therewith by a suitable ball race 21. All of these parts are covered or enclosed by a suitable cap 22 threaded upon the socket 17, and which cap 22 is also provided with a central opening in which the lamp post 15' passes. Surrounding the lamp post 15' and interposed between the cap 22 and the ball race 21 is a coil spring 23 to permit the lamp to yield under certain conditions and at the same time prevent the lamp from rattling. The lamp post 15' extends through the socket 17 and terminates to provide a lateral extension 24 which is connected with one end of the link 25 the opposite end of which is connected with the steering arm 13 in a manner to be hereinafter described.

The lateral extension 24 just referred to is formed with a socket 26 and has associated therewith a suitable cap 27. This cap is preferably threaded on the socket and provided with a central opening to receive the offset extremity 28 of the link 25.

This offset extremity 28 is formed with a cone shaped portion 29 which is received by the socket 26 and which reposes upon a series of ball bearings 30 as clearly illustrated in Figure 3. Similar ball bearings 31 repose upon the upper side of the cone shaped portion 29 and are held in place by a suitable race 32. Surrounding the offset extremity 28 is a coil spring 33 which is interposed between one end of the cap 27 and the race 32. Manifestly this construction is somewhat similar to the construction described in connection with the lamp-post mounting, and permits the headlamps to turn easily and readily with the steering mechanism of the vehicle, and at the same time eliminate rattling or undue vibration of the lamps.

With this object in view the other end of the link 25 is connected with the steering arm 13 in substantially the same manner as clearly illustrated in Figure 4. In this view will be noted that a stationary shaft or pivot 34 rises from the clamp 35 surrounding the steering arm 13, mounted on this shaft 34 is the adjacent end of the link 25. This end of the link 25 is also formed with a socket 36 to accommodate the cone like portion 37 on the shaft 34, and which cone like portion reposes upon ball bearings 38 as illustrated. Similar ball bearings 39 repose upon the cone like portion and are held properly positioned by means of a race 40. A cap 41 encloses these parts and is preferably threaded on the socket 36, the cap 41 having a central opening to receive the adjacent end of the shaft 34.

Surrounding the shaft 34 is a coil spring 42 which is interposed between the race 40 and the adjacent end of the cap 41. Manifestly when the steering arm 13 is actuated in the ordinary well known manner, movement is imparted to the link 25 to simultaneously turn the headlamps 15, the lamps being always turned in a direction to maintain their light rays directly in the path of the machine to properly illuminate the course being pursued thereby.

While it is believed that from the foregoing description the nature and advantages of the invention will be readily apparent, I desire to have it known that I do not limit myself to what is herein illustrated and described and that such changes may be resorted to when desired as fall within the scope of what is claimed.

What I claim is:

1. The combination with a vehicle steering mechanism, of a clamp including a socket member, a cap therefor having a central opening, a headlamp including a post received by the opening and socket member, means for supporting the post within the socket member for rotation, yieldable means associated with the post to prevent rattling of the headlamp, a lateral extension formed on the lower end of said post, a socket member carried by said extension, a cap for the second mentioned socket member having a central opening, a link connecting the steering mechanism with said second mentioned socket member and including an offset portion received by said member and passed through the opening in said cap therefor, a cone shaped portion formed on the offset portion, ball bearings arranged within the socket member above and below the cone shaped portion, and yieldable means connected with the offset portion to prevent rattling of the connection between said parts.

2. The combination with a vehicle steering mechanism including a steering arm, of a clamp including a socket member, a cap therefor having a central opening, a headlamp including a post received by the opening and said socket member, means for supporting the post for rotation within the socket member, yieldable means associated with the post to prevent rattling of the headlamp, a lateral extension formed on the lower end of the post, a link connecting said extension with the steering arm of said steering mechanism, said link including a socket member at one end, a clamp associated with said steering arm and including a stationary pivot received by said socket member of the link, a cone shaped portion formed on said pivot and arranged within said socket, a cap closing said socket, ball bearings arranged above and below the cone shaped portion of said pivot, and resilient means associated with said pivot to prevent rattling of the connection between the steering arm and said link.

In testimony whereof I affix my signature.

SAM BOYKIN SHORT.